May 13, 1941. G. D. ARNOLD 2,241,654
ART OF PRESERVING VALUABLE ELEMENTS OF ORGANIC MATERIALS
Filed Sept. 22, 1938
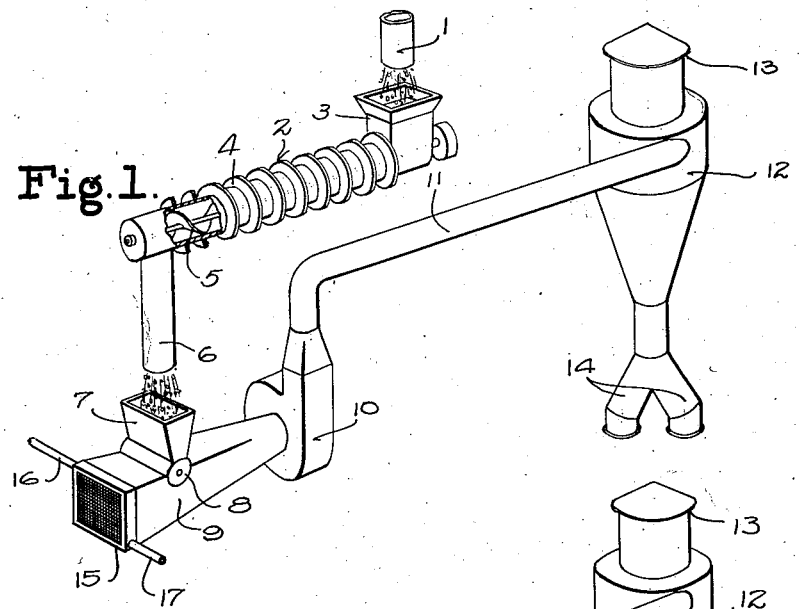
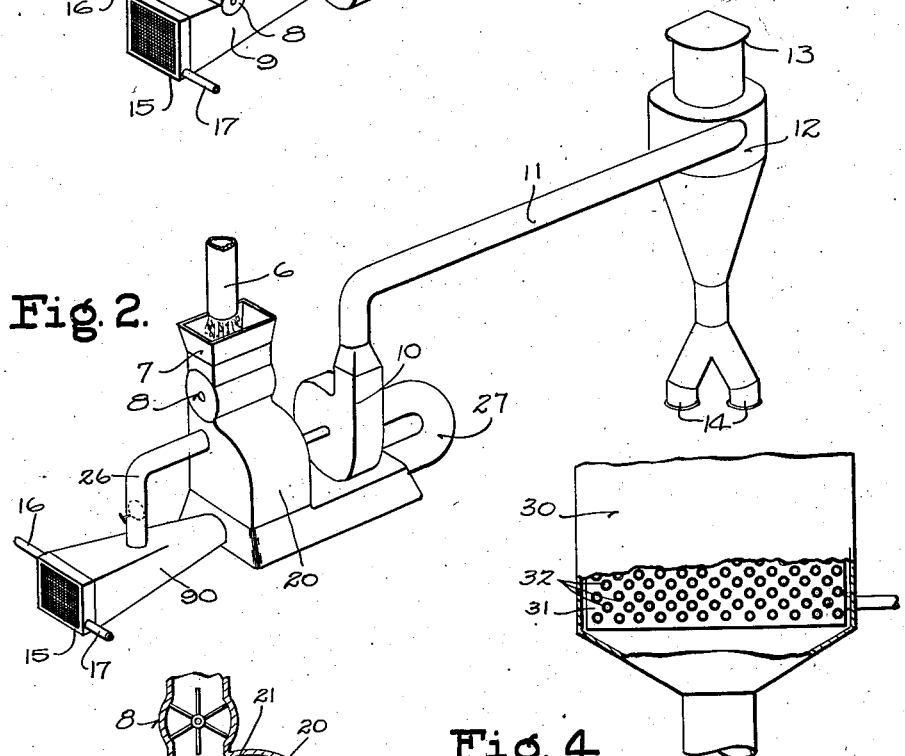
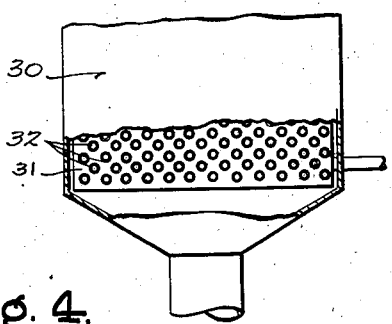
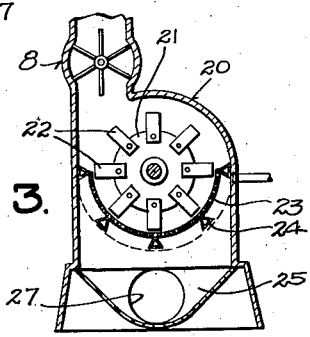
INVENTOR.
GERALD D. ARNOLD
BY
Wheeler, Wheeler + Wheeler
ATTORNEYS Patented May 13, 1941

2,241,654

UNITED STATES PATENT OFFICE 2,241,654

ART OF PRESERVING VALUABLE ELEMENTS OF ORGANIC MATERIALS

Gerald D. Arnold, Wauwatosa, Wis.

Application September 22, 1938, Serial No. 231,110

2 Claims. (Cl. 99—2)

This invention relates to improvements in the art of preserving valuable elements of organic materials.

The invention has particular reference to the preservation of finely divided or ground fresh produce, but is also applicable to other finely divided products which are subject to loss of valuable ingredients when stored under high temperature conditions. By way of exemplifying the process, I shall refer primarily to such stock food as ground dehydrated alfalfa meal, wherein the carotene and corresponding vitamin A content is subject to loss during storage.

It is the primary object of the invention to preserve the color and vitamin A content of herbacious stock foods. Such foods, when fresh, constitute a major source of vitamin A but when the fodder has been stored in sacks or bins for a substantial period it is usually found to have lost its carotene and its vitamin A content to a large degree, depending on the time of storage and other factors. The process and preparation which give the best showing of vitamin A initially involve the artificial dehydration of the comminuted fodder, the grinding thereof in the mill, and the sacking of the meal. Freshly prepared, the artificially dehydrated product shows superior vitamin content to sun dried fodder which has otherwise been similarly treated. But the deterioration rate, from a vitamin standpoint, of the artificially dehydrated and ground product has been somewhat higher than the loss of vitamin A content in the produce otherwise handled.

I have discovered that the loss of carotene and vitamin A content in fresh produce is not merely due to its exposure to heat but, quite largely, due to its exposure to what may be called the stored heat content in the produce itself as a result of its treatment. A mass of this produce, when comminuted, and particularly when ground, is an excellent thermal insulator. Furthermore, the dehydration process and the grinding process both deliver large quantities of heat to the individual particles of material. When such heat is maintained above normal atmospheric temperatures the loss of carotene and vitamin A is very rapid. When the product, for example, alfalfa meal, is delivered to a bin or sack and, if sacked, is perhaps piled with other sacks, the produce on the exterior of the mass thermally insulates the produce in the interior, with the result that the temperatures resulting from the dehydration or the grinding or both, are preserved in the mass not merely for days but for weeks and even months, at levels materially in excess of atmospheric temperatures.

I have further discovered that if the material is artificially cooled following its discharge from treatment, a very desirable converse situation exists, and it is the object of the present invention to remove by artificial cooling all heat in excess of normal atmospheric temperature and preferably, some of the natural heat of the product, and to subsequently store the cooled product under such conditions that the product at the surface of the mass thermally insulates the bulk of the product to prevent heat absorption. Thus I seek not merely to eliminate the loss of vitamin A through heat delivered to the material during processing, but I also seek to render the safe storage of the material almost independent of external atmospheric temperatures over substantial periods of time to the end that the produce treated in accordance with the present disclosure may be stored for periods up to several weeks or months with substantially less loss of vitamin A than would be experienced in the use of previous methods and apparatus.

Thus it is my object not only to eliminate superatmospheric temperature from the product, but also to reduce the product preferably to temperatures at or below 70 degrees. I find that if the temperature is of the order of 70 degrees I can successfully store the product without serious loss of vitamin A content even though the surrounding atmospheric temperatures may range to 100 degrees and over for a period of a few weeks. Such conditions are met, for example, in the Imperial Valley in California, where temperatures in excess of 100 degrees F. are common for several weeks in July and August. Under such conditions even sun dried alfalfa will lose its vitamin A content, but if such alfalfa is treated in accordance with this invention it may be stored indefinitely until needed without serious loss, for before it becomes excessively warm the cooler weather of autumn will have arrived to prevent further heating by the atmosphere.

In the drawing:

Figs. 1 and 2 illustrate diagrammatically two different types of produce for the practice of this invention.

Fig. 3 represents in cross section an improved form of hammermill such as may be used in the Fig. 2 drawing.

Fig. 4 is a diagrammatic view partially in front elevation and partially in section, showing a storage hopper in which continued refrigeration of the contents may be practiced during storage, such a hopper being optionally usable with or independently of the produce shown in Fig. 1 and Fig. 2.

Like parts are identified by the same reference characters throughout the several views.

The pipe 1 may be understood to be the discharge conduit leading from any suitable dehydrating apparatus such, for example, as those shown in my Patents Nos. 1,988,677 and 2,076,872. From pipe No. 1 the comminuted and dehydrated material may, if desired, pass to a pre-cooling apparatus comprising a tube 2 having a hopper 3 and provided externally with cooling fins at 4. Within the tube a conventional screw conveyor 5 operates to feed the material through the discharge pipe 6 into the hopper 7 of a rotary charging valve 8 which admits the material, without any substantial excess of air, into the conduit 9 which leads to the eye of a blower fan 10. The discharge pipe 11 from the blower fan communicates with a separator 12 into which the material is pneumatically discharged. At the separator the air passes out through the vent 13 and the alfalfa is delivered to the bagger spouts 14.

In accordance with the present invention a refrigerating radiator 15 which may be supplied with brine or refrigerant or even with cold water from a deep well while circulated therethrough by means of pipes 16 and 17, is placed in the path of all of the air admitted through conduit 9 to the fan 10. The material delivered to the conduit from hopper 7 through the charging valve 8 is dropped into the path of the chilled air to be pneumatically propelled thereby to the sacker 14. In the course of its travel with the chilled air, the material becomes refrigerated to any desired degree so that when the material is delivered into the bags from the spouts 14 it will be materially chilled. Preferably, it will not only have lost the heat imparted to it in the dehydrator, but it will also be chilled below normal atmospheric temperatures. Thus, when it is put in the sack the mass of material in the center of the sack will be insulated by the material on the periphery against heat absorption, and the center of the sack will remain chilled for a period of weeks, particularly if the sack is piled with other sacks in accordance with the usual practice where storage is necessary.

The arrangement shown in Fig. 2 is similar with the exception that here the alfalfa is ground into meal in a hammermill 20. The use of the pre-cooler shown in Fig. 1 is, of course, optional and may be included in the Fig. 2 arrangement. The rotor 21 of the hammermill carries hammers 22 in the usual way, and these grind the produce against a foraminous screen 23 of arcuate form. The screen is preferably cooled by a number of pipes 24 which act as supports for the screen and also carry a suitable refrigerant for absorbing heat from the screen. This prevents the screen from heating up during the mechanical operation of the hammermill, and it not only prevents the screen from delivering heat to the particles, but it enables the screen to absorb heat from the material ground thereon.

Below the screen the ground material falls into a channel-shaped base 25 through which air is delivered from the inlet conduit 26. Such air is chilled in the radiator 15 in the manner previously described. A damper-controlled bypass 26 may, if desired, carry a portion of the chilled air to that part of the hammermill casing which is above the screen.

From the channel 25 in the base of the hammermill the material is carried pneumatically through the duct 27 to the eye of the blower fan 10 which corresponds to the fan previously described and which creates the current necessary for the pneumatic delivery of the ground and chilled material through pipe 11 to the separators 12. Here, as before, the material is centrifugally separated from the air. The air escapes through vent 13 and the material passes through the sacking spouts 14.

The material delivered from the dehydrating apparatus is ordinarily at temperatures of 110° to 180° F. If the already warm material is then ground the temperature is usually raised at least 10° F. so that the delivered product would, but for the present invention, be at a temperature of 120° to 190° F. or over.

Passing the material through a conveyor trough carried by air or otherwise, as in the pre-cooler above described, is frequently the best and cheapest way of reducing its temperature to the temperatures desired. In cool weather, as in the autumn of the year in most localities, no other cooling arrangement is required. Or, when the weather is not so cool, the water or brine jacket above described may be applied to such a trough instead of to the hammermill as shown. Regardless of the use of one or another of the various cooling devices herein disclosed, it is desirable that the temperature of the material should usually be reduced to 70° or lower, although I do not fix the 70° temperature as an essential of the invention since any approach thereto is bound to be beneficial and the requirements in this regard will naturally vary according to the length of time for which the material is to be stored before use.

Naturally, the cooler the material can be immediately made, the greater will be the vitamin A saving effected. Practically, however, it is frequently difficult to maintain a desirable low temperature over a long period of storage. Consequently, from a practical standpoint, it is usually sufficient to reduce the temperature of the product to 70 or 75 degrees. Ordinarily this temperature can be reached without mechanical refrigeration by simply circulating the cold water from a deep well through the radiator 15. Where such water can be used the cost of the treatment is negligible. Insofar as the material can be kept at approximately 70 degrees F. it will lose only about 10% of its carotene content in three months, whereas at 100 degrees F. or over it will lose up to 80% of its carotene content in three months. These figures emphasize the importance of the immediate chilling of the material and its maintenance at moderate temperatures throughout any period for which it must be stored.

For periods of storage which only range up to a few weeks the great bulk of the material will be kept substantially at the temperature of delivery to the sacks where such delivery temperature is not too greatly sub-atmospheric. As above noted, where the usual practice of piling the sacks is followed, the sacks exposed in the pile will protect those at the center of the pile with the result that the period of storage can safely be increased.

Where the material is to be stored over long periods a refrigerated bin may be desirable. If the material is thoroughly chilled before being put in the bin it may be sufficient merely to chill the wall of the bin to prevent heat absorption thereto. Instead of, or in addition to chilling the material during its pneumatic conveyance as heretofore described, however, it is possible to chill the material in the bin provided the refrigerating pipes are spaced so closely together as to overcome the tendency of the material to thermally insulate such masses of material as are remote from the pipes. The bin shown at 30 in Fig. 4 is provided at 31 with a header from which refrigerating pipes 32 are run at close intervals to enter headers (not shown) set opposite to header 31 in accordance with the usual practice in pipe installations. The pipes 32 are sufficiently close together so that no material in the storage part of the bin is so remote from the pipes that it cannot readily deliver its heat thereto. In this way the material can be chilled with sufficient rapidity and sufficiently low temperature maintained to preserve its vitamin A content.

Other organic materials may with advantage be treated in accordance with the invention herein disclosed. Dehydrated canning factory refuse such as pea, corn, tomato, citrous, and fish cannery waste and dried grain and dried kelp are improved by treatment in accordance herewith. However, since these materials do not have as high a carotene and vitamin A content as fresh produce, the treatment is not quite as important.

Various kinds of fertilizers which are finely ground before going into a sack or storage, seem to be helped by treatment in accordance with this invention. Although there is no problem here of loss of vitamin A content, such fertilizers and other materials seem in the presence of retained heat to dissipate nitrogen-containing, and other gases, such dissipation reducing the fertilizing value of the product.

I claim:

1. The method of treating freshly grown edible organic produce with a high natural moisture content of growth to preserve its food value and vitamin and carotene content, such method comprising the comminution of the produce, the artificial dehydration of the comminuted produce to such a point as to be permanently keeping, the substantially immediate chilling of the dried comminuted produce to temperatures approximating 70° F. and not substantially higher before packaging the produce, and the subsequent storage of the produce in a tightly packed mass wherein the portion of such produce at the exterior insulates and holds the portion of such produce interiorly of the mass substantially at said temperatures until withdrawn for use.

2. The method of claim 1 immediately preceded by the step of freshly cutting a leafy forage crop, such freshly cut crop comprising the produce of claim 1.

GERALD D. ARNOLD.